United States Patent
Luo et al.

(10) Patent No.: US 10,164,797 B2
(45) Date of Patent: Dec. 25, 2018

(54) DATA TRANSMISSION METHOD AND STATION

(71) Applicant: HUAWEI TECHNOLOGIES CO., LTD., Shenzhen, Guangdong (CN)

(72) Inventors: Yi Luo, Shenzhen (CN); Yunbo Li, Shenzhen (CN); Lianbo Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 80 days.

(21) Appl. No.: 15/180,403

(22) Filed: Jun. 13, 2016

(65) Prior Publication Data

US 2016/0285649 A1 Sep. 29, 2016

Related U.S. Application Data

(63) Continuation of application No. PCT/CN2014/071672, filed on Jan. 28, 2014.

(51) Int. Cl.
*H04L 12/64* (2006.01)
*H04W 24/08* (2009.01)
*H04W 74/08* (2009.01)

(52) U.S. Cl.
CPC .......... *H04L 12/6418* (2013.01); *H04W 24/08* (2013.01); *H04W 74/0833* (2013.01)

(58) Field of Classification Search
CPC .................................................. H04L 12/6418
(Continued)

(56) References Cited

U.S. PATENT DOCUMENTS

| 7,187,668 B2 | 3/2007 | Kandala |
| 2005/0195876 A1 | 9/2005 | Sato et al. |

(Continued)

FOREIGN PATENT DOCUMENTS

| CN | 102300257 A | 12/2011 |
| CN | 102624608 A | 1/2012 |

(Continued)

OTHER PUBLICATIONS

Roy et al., "Fast Multichannel Switching for IEEE 802.11s Multiradio Wireless Mesh Networks," IEEE International Workshop on Heterogeneous, pp. 303-308, Institute of Electrical and Electronics, New York, New York (2011).

*Primary Examiner* — Shripal K Khajuria
(74) *Attorney, Agent, or Firm* — Leydig, Voit & Mayer, Ltd.

(57) ABSTRACT

The present invention provides a data transmission method. In the method of the present invention, a station receives an indication frame sent by an access point, where the indication frame is used for allocating a designated random contention channel; a channel state of the designated random contention channel is sensed according to the indication frame; and the station sends data on the designated random contention channel after it is detected that the designated random contention channel is in an idle state. Because in the method of the present invention, a designated random contention channel is allocated to a station, the station can send data on the designated random contention channel, contention among stations is reduced and a time for a station to be connected to a random contention channel is reduced.

20 Claims, 5 Drawing Sheets

(58) Field of Classification Search
USPC .......................................................... 370/229
See application file for complete search history.

(56) References Cited

U.S. PATENT DOCUMENTS

| | | |
|---|---|---|
| 2008/0181192 A1 | 7/2008 | Nabetani et al. |
| 2009/0040974 A1 | 2/2009 | Goldhamer |
| 2010/0309836 A1* | 12/2010 | Sugawara ......... H04W 72/1231 370/312 |
| 2011/0150042 A1* | 6/2011 | Liu ..................... H04B 1/713 375/133 |
| 2012/0069788 A1* | 3/2012 | Shen .................. H04W 74/006 370/315 |
| 2012/0314741 A1* | 12/2012 | Arita .................... H04L 1/0061 375/219 |
| 2013/0028110 A1 | 1/2013 | Kogawa |
| 2014/0010211 A1 | 1/2014 | Asterjadhi et al. |
| 2014/0185514 A1 | 7/2014 | Ito et al. |
| 2014/0226564 A1 | 8/2014 | To et al. |
| 2015/0071304 A1 | 3/2015 | Li et al. |

FOREIGN PATENT DOCUMENTS

| | | |
|---|---|---|
| CN | 102595569 A | 7/2012 |
| EP | 2552168 A1 | 1/2013 |
| EP | 2579477 A2 | 4/2013 |
| JP | H08125656 A | 5/1996 |
| JP | 2001053745 | 2/2001 |
| JP | 2008187448 A | 8/2008 |
| JP | 2010124330 A | 6/2010 |
| JP | 2013030845 A | 2/2013 |
| JP | 2016-548266 | 5/2018 |
| WO | 2006075733 A1 | 7/2006 |
| WO | WO 2013170609 A1 | 11/2013 |

* cited by examiner

DATA TRANSMISSION METHOD AND STATION

CROSS-REFERENCE TO RELATED APPLICATIONS

This application is a continuation of International Patent Application No. PCT/CN2014/071672, filed on Jan. 28, 2014, which is hereby incorporated by reference in its entirety.

TECHNICAL FIELD

The present invention relates to the field of wireless communications technologies, and in particular, to a data transmission method and a station.

BACKGROUND

In existing wireless network communication, data transmission is generally performed by using an unauthorized spectrum in a random contention manner. For example, data transmission is performed in a random contention manner in a network such as a Wireless Local Area Network (Wireless Local Area Network, WLAN) and a Bluetooth network. When data transmission is performed in a random contention manner, different wireless networks are equal in position, and different stations in a same wireless network are also equal in position, so that all stations share all random contention channels in the wireless networks. However, when more stations are deployed in a wireless network, an average time required for a station to be connected to a shared random contention channel becomes longer, which causes that quality of service of a real-time service of the wireless network is hardly ensured.

SUMMARY

An objective of the present invention is to provide a data transmission method. By means of the method, contention among stations can be reduced, so as to reduce a time for a station to be connected to a random contention channel.

A first aspect of the present invention provides a data transmission method, including:

receiving, by a station, an indication frame sent by an access point, where the indication frame is used for allocating a designated random contention channel;

sensing, according to the indication frame, a channel state of the designated random contention channel; and sending, by the station, data on the designated random contention channel after it is detected that the designated random contention channel is in an idle state.

With reference to the first aspect of the present invention, in a first possible implementation manner of the first aspect, the sending, by the station, data on the designated random contention channel after it is detected that the designated random contention channel is in an idle state includes:

executing, by the station, backoff on the designated random contention channel after it is detected that the designated random contention channel is in an idle state; and sending, by the station, data on the designated random contention channel after a backoff time of the station ends.

With reference to the first aspect of the present invention or the first possible implementation manner of the first aspect, in a second possible implementation manner of the first aspect, the receiving, by a station, an indication frame sent by an access point includes:

receiving the indication frame sent by the access point, where the indication frame includes channel frequency information of the designated random contention channel; and the sensing, according to the indication frame, a channel state of the designated random contention channel includes:

sensing, according to the channel frequency information of the designated random contention channel, the channel state of the designated random contention channel.

With reference to the first aspect of the present invention or the first or second possible implementation manner of the first aspect, in a third possible implementation manner of the first aspect, the receiving an indication frame sent by an access point includes:

receiving the indication frame sent by the access point, where the indication frame includes time information of random contention;

the method further includes:

acquiring, according to the time information, of random contention, included in the indication frame, a time of random contention for sending, by the station, data on the designated random contention channel; and the sending, by the station, data on the designated random contention channel after it is detected that the designated random contention channel is in an idle state includes:

sending data on the designated random contention channel within the time of random contention after it is detected that the designated random contention channel is in an idle state.

With reference to the first aspect of the present invention or any one of the first to third possible implementation manners of the first aspect, in a fourth possible implementation manner of the first aspect, the sensing, according to the indication frame, a channel state of the designated random contention channel includes:

detecting, by the station, signal strength on the designated random contention channel according to the indication frame; and determining that the designated random contention channel is in an idle state when the detected signal strength on the designated random contention channel is less than or equal to a preset threshold.

With reference to the first aspect of the present invention or any one of the first to third possible implementation manners of the first aspect, in a fifth possible implementation manner of the first aspect, the sensing, according to the indication frame, a channel state of the designated random contention channel includes:

detecting, by the station on a spectrum, signal strength on a subcarrier corresponding to the designated random contention channel; and determining that the designated random contention channel is in an idle state when the detected signal strength on the subcarrier corresponding to the designated random contention channel is less than or equal to a preset threshold.

With reference to the first aspect of the present invention or either of the first and second possible implementation manners of the first aspect, in a sixth possible implementation manner of the first aspect, the receiving an indication frame sent by an access point includes:

receiving the indication frame sent by the access point, where the indication frame includes period time information of random contention;

the method further includes:

acquiring, according to the period time information, of random contention, included in the indication frame, a period time of random contention for sending, by the station, data on the designated random contention channel; and the sending, by the station, data on the designated random contention channel after it is detected that the designated random contention channel is in an idle state includes:

sending data on the designated random contention channel within the period time of random contention after it is detected that the designated random contention channel is in an idle state.

With reference to the first aspect of the present invention or any one of the first to sixth possible implementation manners of the first aspect, in a seventh possible implementation manner of the first aspect, the sending, by the station, data on the designated random contention channel after it is detected that the designated random contention channel is in an idle state includes:

sending, by the station, data to the access point or another station on the designated random contention channel after it is detected that the designated random contention channel is in an idle state.

With reference to the first aspect of the present invention or any one of the first to seventh possible implementation manners of the first aspect, in an eighth possible implementation manner of the first aspect, the indication frame is further used for allocating a channel for scheduled transmission; and the method further includes: sending, according to the indication frame, data on the channel for scheduled transmission.

With reference to the eighth implementation manner of the first aspect of the present invention, in a ninth possible implementation manner of the first aspect, the sending, by the station, data on the designated random contention channel after it is detected that the designated random contention channel is in an idle state includes:

sending, by the station, data on the designated random contention channel in an Orthogonal Frequency-Division Multiple Access OFDMA manner, where the random contention channel and the channel for scheduled transmission satisfy orthogonal frequency-division multiplexing OFDM symbol synchronization.

A second aspect of the present invention provides a station, including:

a receiving unit, configured to receive an indication frame sent by an access point, where the indication frame is used for designating a random contention channel;

a sensing unit, configured to sense, according to the indication frame received by the receiving unit, a channel state of the designated random contention channel; and a sending unit, configured to send data on the designated random contention channel after the sensing unit detects that the designated random contention channel is in an idle state.

With reference to the second aspect of the present invention, in a first possible implementation manner of the second aspect, the sending unit is configured to execute backoff on the designated random contention channel after the sensing unit detects that the designated random contention channel is in an idle state, which includes:

being configured to execute backoff on the designated random contention channel after the sensing unit detects that the designated random contention channel is in an idle state; and send data on the designated random contention channel after a backoff time of the station ends.

With reference to the second aspect of the present invention or the first possible implementation manner of the second aspect, in a second possible implementation manner of the second aspect, the receiving unit being configured to receive an indication frame sent by an access point includes:

being configured to receive the indication frame sent by the access point, where the indication frame includes channel frequency information of the designated random contention channel; and the sensing unit being configured to sense, according to the indication frame received by the receiving unit, a channel state of the designated random contention channel includes:

being configured to sense, according to the channel frequency information, of the designated random contention channel, received by the receiving unit, the channel state of the designated random contention channel.

With reference to the second aspect of the present invention or the first or second possible implementation manner of the second aspect, in a third possible implementation manner of the second aspect, the receiving unit being configured to receive an indication frame sent by an access point includes:

being configured to receive the indication frame sent by the access point, where the indication frame includes time information of random contention;

the receiving unit is further configured to acquire, according to the time information, of random contention, included in the received indication frame, a time of random contention for sending, by the station, data on the designated random contention channel; and the sending unit being configured to send data on the designated random contention channel after the sensing unit detects that the designated random contention channel is in an idle state includes:

being configured to send data on the designated random contention channel within the time, of random contention, acquired by the receiving unit after the sensing unit detects that the designated random contention channel is in an idle state.

With reference to the second aspect of the present invention or any one of the first to third possible implementation manners of the second aspect, in a fourth possible implementation manner of the second aspect, the sensing unit being configured to sense, according to the indication frame received by the receiving unit, a channel state of the designated random contention channel includes:

being configured to detect, according to the indication frame received by the receiving unit, signal strength on the designated random contention channel; and determine that the designated random contention channel is in an idle state when the detected signal strength on the designated random contention channel is less than or equal to a preset threshold.

With reference to the second aspect of the present invention or any one of the first to third possible implementation manners of the second aspect, in a fifth possible implementation manner of the second aspect, the sensing unit being configured to sense, according to the indication frame received by the receiving unit, a channel state of the designated random contention channel includes:

detecting, by the station on a spectrum, signal strength on a subcarrier corresponding to the designated random contention channel; and determining that the designated random contention channel is in an idle state when the detected signal strength on the subcarrier corresponding to the designated random contention channel is less than or equal to a preset threshold.

With reference to the second aspect of the present invention or either of the first and second possible implementation manners of the second aspect, in a sixth possible implementation manner of the second aspect, the receiving unit being configured to receive an indication frame sent by an access point includes:

being configured to receive the indication frame sent by the access point, where the indication frame includes period time information of random contention;

the receiving unit is further configured to acquire, according to the period time information, of random contention, included in the received indication frame, a period time of random contention for sending, by the station, data on the designated random contention channel; and the sensing unit being configured to sense, according to the indication frame received by the receiving unit, a channel state of the designated random contention channel includes:

being configured to send data on the designated random contention channel within the period time of random contention after it is detected that the designated random contention channel is in an idle state.

With reference to the second aspect of the present invention or any one of the first to sixth possible implementation manners of the second aspect, in a seventh possible implementation manner of the second aspect, the sending unit being configured to send data on the designated random contention channel after the sensing unit detects that the designated random contention channel is in an idle state includes:

being configured to send data to the access point or another station on the designated random contention channel after the sensing unit detects that the designated random contention channel is in an idle state.

With reference to the second aspect of the present invention or any one of the first to seventh possible implementation manners of the second aspect, in an eighth possible implementation manner of the second aspect, the receiving unit being configured to receive an indication frame sent by an access point includes:

the receiving unit is configured to receive the indication frame sent by the access point, where the indication frame is further used for allocating a channel for scheduled transmission; and the sending unit is further configured to send, according to the indication frame received by the receiving unit, data on the channel for scheduled transmission.

With reference to the eighth implementation manner of the second aspect of the present invention, in a ninth possible implementation manner of the second aspect, the sending unit being configured to send data on the designated random contention channel after it is detected that the designated random contention channel is in an idle state includes:

being configured to send data on the designated random contention channel in an Orthogonal Frequency-Division Multiple Access OFDMA manner, where the random contention channel and the channel for scheduled transmission satisfy orthogonal frequency-division multiplexing OFDM symbol synchronization.

In the method of the present invention, a station sends, according to an indication frame, data on a random contention channel designated by the indication frame. Therefore, in the method of the present invention, different random contention channels may be allocated to different stations to perform data transmission, and contention among stations can be reduced, so as to reduce a time for a station to be connected to a random contention channel, thereby ensuring quality of service of a real-time service of a wireless network and improving efficiency of data transmission of a network.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
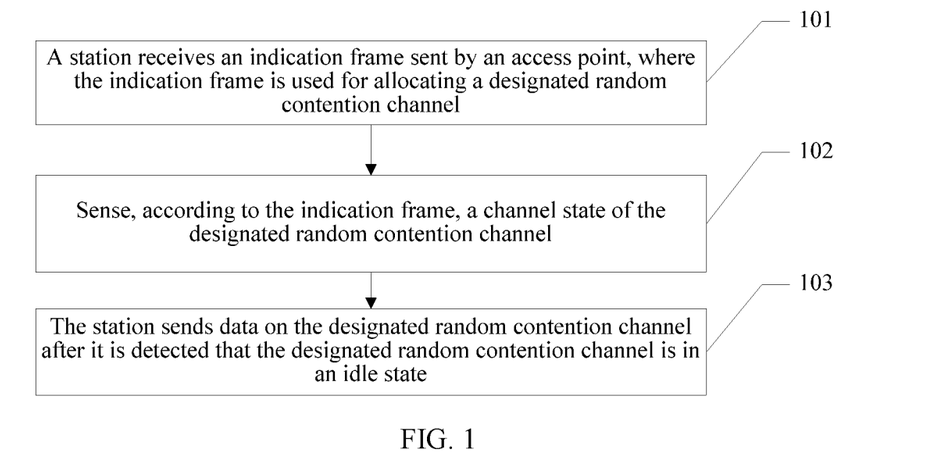
FIG. 1 is a schematic flowchart of a data transmission method according to Embodiment 1.

As shown in FIG. 1, Embodiment 1 of the present invention provides a data transmission method, and the method may specifically include:

101. A station receives an indication frame sent by an access point, where the indication frame is used for allocating a designated random contention channel.

The access point may send the indication frame by using all channels or some channels.

102. Sense, according to the indication frame, a channel state of the designated random contention channel.

For example, the indication frame may include channel frequency information of the designated random contention channel, and the station may determine the designated random contention channel according to the channel frequency information of the designated random contention channel and sense the channel state of the designated random contention channel.

103. The station sends data on the designated random contention channel after it is detected that the designated random contention channel is in an idle state.

In this embodiment, because a station sends data on a designated random contention channel according to an indication frame, in the method, different random contention channels may be allocated to different stations to perform data transmission, and contention among stations can be reduced, so as to reduce a time for a station to be connected to a random contention channel, thereby ensuring quality of service of a real-time service of a wireless network and improving efficiency of data transmission of a network.

In order to prevent the station from causing a conflict with another station when the station is connected to the designated random contention channel, step 103 may specifically include: executing, by the station, backoff on the designated random contention channel after it is detected that the designated random contention channel is in an idle state; and sending, by the station, data on the designated random contention channel after a backoff time of the station ends.

In addition, in Embodiment 1 of the present invention, the designated random contention channel may only occupy some of channel resources between the station and the access point, and the remaining some channel resources may be used as a channel for scheduled transmission. In order to fully use the channel resources, the following technical measures may further be taken in this embodiment of the present invention. Specifically, the indication frame that is sent by the access point and that is received by the station may be further used for allocating a channel for scheduled transmission; and the station sends, according to the indication frame, data on the channel for scheduled transmission. Therefore, by applying this embodiment of the present invention, the station not only can send data on a designated random contention channel according to an indication frame, but also can send, according to the indication frame, data on a channel for scheduled transmission. As compared with a manner of sending data by using a designated random contention channel, a manner of sending data by using a channel for scheduled transmission has an advantage of higher quality of service of a real-time service. Therefore, the method in this embodiment of the present invention can further improve the quality of service of the real-time service and improve efficiency of a wireless system in a scenario in which stations are densely deployed and in a case of a large quantity of users.

In Embodiment 1 of the present invention, the network may be a Wi-Fi network based on an unauthorized frequency band, or may be an LTE network, a CDMA network, a GSM network or the like based on an authorized frequency band. For example, in a Wi-Fi network, an access point may allocate a random contention channel and a channel for scheduled transmission. When a large quantity of user terminals perform wireless communication by using the Wi-Fi network, some terminals may send data by using channels for scheduled transmission, that is, send data on these channels in a scheduled transmission mode, so as to ensure quality of service of a real-time service. When user terminals need to send a great amount of short packet data, some terminals may send data by using random contention channels, that is, send data on these channels in a random contention mode, so as to reduce system overheads and improve system flexibility. In addition, because the station may send, after executing backoff, data on the designated random contention channel when the designated random contention channel is in an idle state, a probability that a conflict occurs when multiple stations use the designated random contention channel may be reduced.

Figure 2:
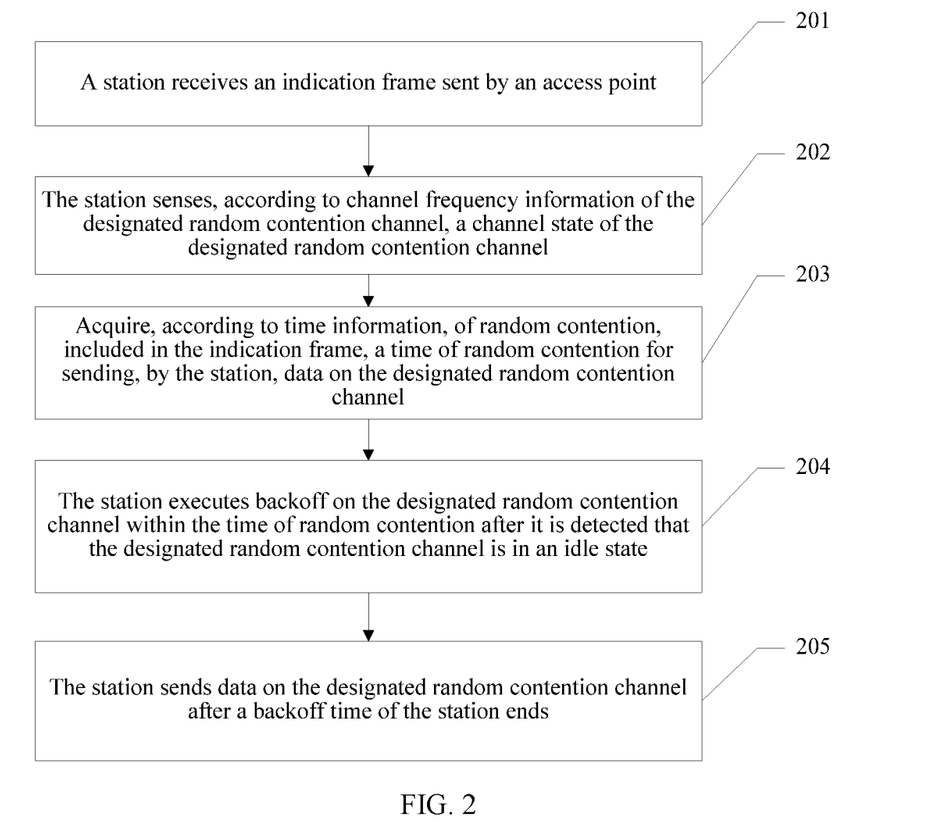
FIG. 2 is a schematic flowchart of another data transmission method according to Embodiment 2.

As shown in FIG. 2, Embodiment 2 of the present invention provides a data transmission method, and a random contention channel and a channel for scheduled transmission exist in a network to which this method is applied. The network is a network based on an unauthorized frequency band or a network based on an authorized frequency band, and the method may specifically include:

201. A station receives an indication frame sent by an access point.

The access point may send the indication frame by using all channels or some channels, where the indication frame is used for designating a random contention channel for the station. The indication frame includes channel frequency information of the designated random contention channel and time information of contention.

202. The station senses, according to channel frequency information of the designated random contention channel, a channel state of the designated random contention channel.

For example, the station may detect, according to the indication frame, signal strength on the designated random contention channel; and determine that the designated random contention channel is in an idle state when the detected signal strength on the designated random contention channel is less than or equal to a preset threshold.

203. Acquire, according to time information, of random contention, included in the indication frame, a time of random contention for sending, by the station, data on the designated random contention channel.

204. The station executes backoff on the designated random contention channel within the time of random contention after it is detected that the designated random contention channel is in an idle state.

205. The station sends data on the designated random contention channel after a backoff time of the station ends.

The foregoing content is further described below with reference to a specific application scenario.

Figure 3:
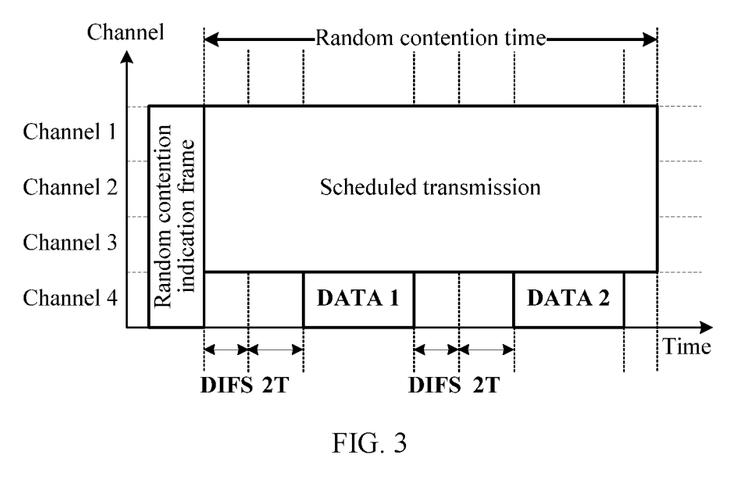
FIG. 3 is a schematic diagram of data transmission in an application scenario.

It is assumed that an access point and two stations are arranged in a network, the two stations are a station STA1 and a station STA2, and both the stations need to send data on a random contention channel and can detect signals of each other. There are four available channels in the network, which are a channel 1, a channel 2, a channel 3, and a channel 4. As shown in FIG. 3, a specific process of data transmission is as follows:

Step 1: An access point generates and sends an indication frame, where the indication frame includes channel frequency information of a designated random contention channel and time information of random contention. The time information of random contention herein is used for enabling a station to send data within a designated time of random contention and may include a start time point of the time of random contention and duration of random contention, or may further include a random contention window. The access point may send the indication frame on all the four channels in the network or may send the indication frame on only one channel, for example, send the indication frame on only the channel 4. In FIG. 3, the indication frame designates the channel 4 as the random contention channel and sets the duration of random contention. After step 1 is performed, the process turns to step 2.

Step 2: STA1 and STA2 receive the indication frame. In this case, STA1 needs to send data DATA1 frame, and STA2 needs to send a DATA2 frame. STA1 randomly selects 2T as a backoff time, where T represents a minimum unit of the backoff time, and STA2 randomly selects 4T as a backoff time.

Step 3: STA1 and STA2 sense a state of the channel 4. When an idle time of the channel 4 reaches a distributed coordination function interframe space (Distributed Coordination Function Interframe Space, DIFS for short) time, STA1 and STA2 execute backoff.

Step 4: After the time 2T passes, the backoff time of STA2 is reduced to 2T, and STA1 sends the data DATA1 frame.

Step 5: The access point receives the DATA1 frame sent by STA1.

Step 6: STA2 senses the state of the channel 4. If STA1 does not have a service sending requirement at this time, the channel 4 does not need to be sensed. After the idle time of the channel 4 reaches a DIFS time, STA2 executes backoff.

Step 7: After the time 2T passes, STA2 sends the DATA2 frame.

Step 8: The access point receives the DATA2 frame sent by STA2.

It should be emphasized that the random contention channel herein not only may be used by the station to send data to the access point in a contention manner, but also may be used for sending, in a contention manner, data between stations that adopt a device to device (English: Device to Device, D2D for short) communication manner. D2D is also referred to as direct link setup (English: Direct link setup, DLS for short) in the Wi-Fi standard and refers to a communication manner in which two stations that can receive a wireless data frame from each other send data to each other directly without needing forwarding performed by the access point. When the stations that adopt the D2D communication manner send data by using a random channel indicated by the access point, channel sensing and random backoff processes are the same as those in the foregoing descriptions, and a receiving station only needs to be identified, during data sending, as a receiving station that adopts the D2D communication manner. In addition, during non data sending, a station that adopts the D2D communication manner needs to keep receiving data on the random contention channel, identifies whether a received data frame is a data frame sent to the current station, and if the received data frame is a data frame sent to the current station, receives the data frame, or if the received data frame is not a data frame sent to the current station, discards the received data frame.

Because the channel for scheduled transmission includes a scheduling channel, in order to prevent the scheduling channel and the random contention channel from causing interference with each other during data sending, within the time of random contention, the station can send data on the designated random contention channel in an Orthogonal Frequency Division Multiple Access (English: Orthogonal Frequency Division Multiple Access, OFDMA for short) manner, where the random contention channel and the channel for scheduled transmission satisfy orthogonal frequency division (English: Orthogonal Frequency Division Multiplexing, OFDM for short) symbol synchronization.

Before the station sends data on the designated random contention channel in an OFDMA manner, it may be determined by using the following steps whether the designated random contention channel is in an idle state. Specifically, the station detects, on a spectrum, signal strength on a subcarrier corresponding to the designated random contention channel; and determines that the designated random contention channel is in an idle state when the detected signal strength on the subcarrier corresponding to the designated random contention channel is less than or equal to a preset threshold.

Because all the stations in the network do not process the same type of service, it is possible that the stations cannot detect signals of each other, which causes a problem of a hidden station, so that a conflict may easily occur when different stations send data. In order to avoid such a problem, the following technical measures may be taken in Embodiment 2 of the present invention.

Specifically, the indication frame that is sent by the access point and that is received by the station further includes information of a designated station group, and if a station in the designated station group can detect a signal of another station in the designated station group, a case in which a sending conflict occurs because a hidden station appears when stations in the designated station group send data by using the random contention channel can be avoided. For example, multiple neighboring stations can be used as one group according to a neighbor list of a station, so that each station in the group can detect a signal of another station in the group, thereby preventing a station from being hidden.

After receiving the indication frame, a station determines, according to the information of the designated station group, whether the station belongs to the designated station group that sends data by using the random contention channel.

If it is determined that the station belongs to the designated station group, the station executes backoff on the designated random contention channel when the designated random contention channel is in an idle state.

The station sends data on the designated random contention channel after a backoff time ends.

Further, the indication frame includes group number information of the designated station group; the station acquires, according to the group number information of the designated station group, a group number of the designated station group; and determines that the station belongs to the acquired designated station group when a group number of a station group to which the station belongs is the same as the acquired group number of the designated station group. After it is determined that the station belongs to the acquired designated station group, a channel state of the designated random contention channel is sensed, and the station executes backoff on the designated random contention channel when it is detected that the designated random contention channel is in an idle state. The station sends data on the designated random contention channel after a backoff time ends.

The foregoing content is further described below with reference to a specific application scenario.

It is assumed that an access point and four stations are arranged in a network, and the four stations are a station STA1, a station STA2, a station STA3, and a station STA4, where STA1 and STA2 can detect signals of each other, but cannot detect signals of STA3 and STA4, and STA3 and STA4 can detect signals of each other, but cannot detect signals of STA1 and STA2. Therefore, STA1 and STA2 are used as a group 0, and STA3 and STA4 are used as a group 1. There are four available channels in the network, which are a channel 1, a channel 2, a channel 3, and a channel 4, and the four channels are independent of each other and do not interfere with each other. A specific process of data transmission is as follows:

Step 1: An access point generates and sends an indication frame, where the indication frame includes channel frequency information of a designated random contention channel, time information of random contention, and group number information of a designated station group. The indication frame herein designates the channel 4 as a random contention channel, sets duration of random contention, and designates that random contention can be performed in the group 0.

Step 2: STA1, STA2, STA3, and STA4 receive the indication frame. Because STA1 and STA2 belong to the group 0, STA1 and STA2 can perform random contention; STA3 and STA4 belong to the group 1 and cannot perform random contention. STA1 selects 2T as a backoff time, where T represents a minimum unit of the backoff time, and STA2 selects 4T as a backoff time.

Step 3: STA1 and STA2 sense a state of the channel 4. After an idle time of the channel 4 reaches a DIFS time, STA1 and STA2 execute backoff.

Step 4: After the time 2T passes, the backoff time of STA2 is reduced to 2T, and STA1 sends a data DATA1 frame.

Step 5: The access point receives the DATA1 frame sent by STA1.

Step 6: STA2 senses the state of the channel 4. If STA1 does not have a service sending requirement at this time, the channel 4 does not need to be sensed. After the idle time of the channel 4 reaches the DIFS time, STA2 executes backoff.

Step 7: After the time 2T passes, STA2 sends a DATA2 frame.

Step 8: The access point receives the DATA2 frame sent by STA2.

In Embodiment 2 of the present invention, an indication frame may include period time information of random contention, where the period time information of random contention is used for representing a period time, which a station has, of random contention, and the station may send data within the time period. After receiving the indication frame, the station may acquire, according to the period time information, of random contention, included in the indication frame, a period time of random contention for sending, by the station, data on a designated random contention channel, and send data on the designated random contention channel within the period time of random contention. Therefore, an access point sends an indication frame once, and a station is enabled to send data within a period time, thereby reducing the number of times of sending a random indication frame.

The foregoing content is further described below with reference to a specific application scenario.

Figure 4:
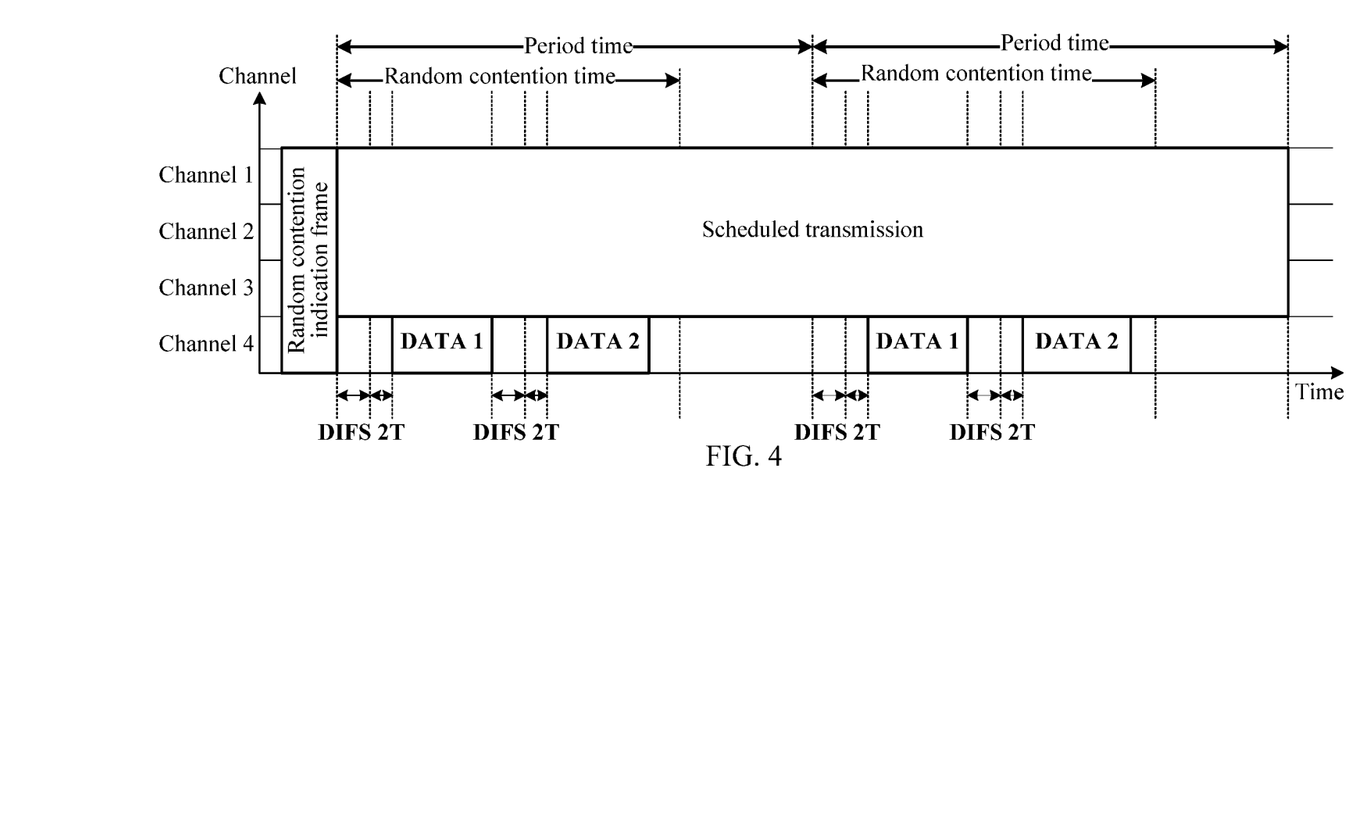
FIG. 4 is a schematic diagram of data transmission in another application scenario.

It is assumed that an access point and two stations are arranged in a network, the two stations are a station STA1 and a station STA2, and both the stations have a requirement of sending periodic service data on a random contention channel. There are four available channels in the network, which are a channel 1, a channel 2, a channel 3, and a channel 4. As shown in FIG. 4, a specific process of data transmission is as follows:

Step 1: An access point generates and sends an indication frame, where the indication frame includes channel frequency information of a designated random contention channel and time information of random contention, where the time information of random contention may specifically be a period time of random contention. The access point may send the indication frame on all the four channels in the network or may send the indication frame on only one channel, for example, send the indication frame on only the channel 4. After step 1 is performed, the process turns to step 2.

Step 2: STA1 and STA2 receive the indication frame. Within a first period time of random contention, STA1 needs to send a DATA1 frame, and STA2 needs to send a DATA2 frame. STA1 randomly selects 2T as a backoff time, where T represents a minimum unit of the backoff time, and STA2 randomly selects 4T as a backoff time.

Step 3: STA1 and STA2 sense a state of the channel 4. After an idle time of the channel 4 reaches a DIFS time, STA1 and STA2 execute backoff.

Step 4: After the time 2T passes, the backoff time of STA2 is reduced to 2T, and STA1 sends the data DATA1 frame.

Step 5: The access point receives the DATA1 frame sent by STA1.

Step 6: STA2 senses the state of the channel 4. If STA1 does not have a service sending requirement at this time, the channel 4 does not need to be sensed. After the idle time of the channel 4 reaches the DIFS time, STA2 executes backoff.

Step 7: After the time 2T passes, STA2 sends the DATA2 frame.

Step 8: The access point receives the DATA2 frame sent by STA2.

After step 8 is performed, STA1 and STA2 wait to enter a next period time of random contention, and step 3 to step 8 are performed again.

In Embodiment 2 of the present invention, the station may send data to the access point or another station on a designated channel. For example, the station is a station that not only can send data to the access point by using the foregoing method, but also can send data to another station by using the foregoing method.

Figure 5:
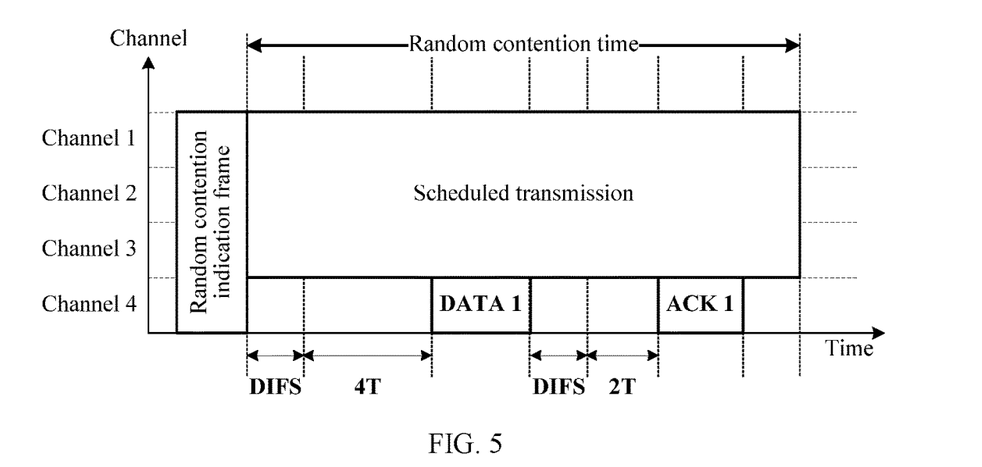
FIG. 5 is a schematic diagram of data transmission in still another application scenario.

For example, it is assumed that an access point and two stations are arranged in a network, the two stations are a station STA1 and a station STA2, and both the stations need to send data on a random contention channel and can detect signals of each other. There are four available channels in the network, which are a channel 1, a channel 2, a channel 3, and a channel 4. As shown in FIG. 5, a specific process of data transmission is as follows:

Step 1: An access point generates and sends an indication frame, where the indication frame includes channel frequency information of a designated random contention channel and time information of random contention.

Step 2: STA1 and STA2 receive the indication frame. In this case, STA1 needs to send a data DATA1 frame, and STA2 does not need to send data. STA1 randomly selects 4T as a backoff time, where T represents a minimum unit of the backoff time, and STA2 randomly selects 2T as a backoff time.

Step 3: STA1 senses a state of the channel 4. After an idle time of the channel 4 reaches a DIFS time, STA1 executes backoff.

Step 4: After the time 4T passes, STA1 sends the DATA1 frame to STA2.

Step 5: STA2 receives the DATA1 frame sent by STA1 and generates a frame ACK 1.

Step 6: STA2 senses the state of the channel 4. After the idle time of the channel 4 reaches the DIFS time, STA2 executes backoff.

Step 7: After the time 2T passes, STA2 sends the frame ACK 1 to STA1.

Step 8: STA1 receives the frame ACK 1 sent by STA2.

Figure 6:
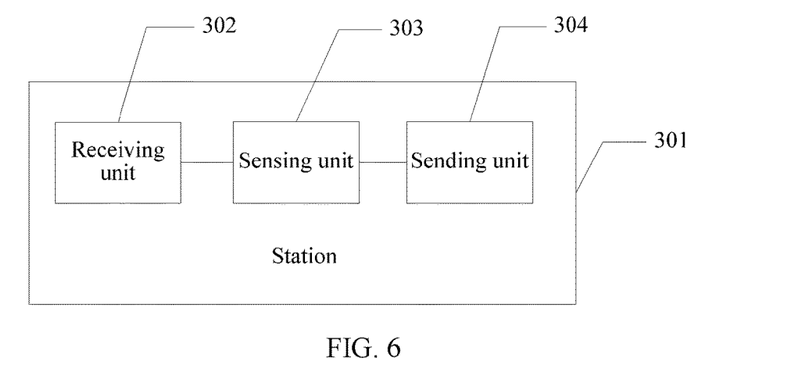
FIG. 6 is a structural block diagram of a station according to Embodiment 3.

As shown in FIG. 6, Embodiment 4 of the present invention provides a station 301, where the station 301 includes:

a receiving unit 302, configured to receive an indication frame sent by an access point, where the indication frame is used for designating a random contention channel;

a sensing unit 303, configured to sense, according to the indication frame received by the receiving unit 302, a channel state of the designated random contention channel; and a sending unit 304, configured to send data on the designated random contention channel after the sensing unit 303 detects that the designated random contention channel is in an idle state.

Figure 7:
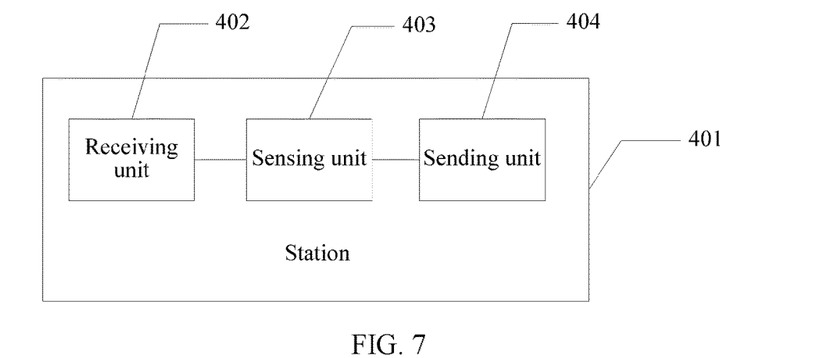
FIG. 7 is a structural block diagram of a station according to Embodiment 4.

As shown in FIG. 7, Embodiment 4 of the present invention provides a station 401, where the station 401 includes:

a receiving unit 402, configured to receive an indication frame sent by an access point, where the indication frame includes information of a designated random contention channel;

a sensing unit 403, configured to sense, according to the indication frame received by the receiving unit 402, a channel state of the designated random contention channel; and a sending unit 404, configured to send data on the designated random contention channel after the sensing unit 403 detects that the designated random contention channel is in an idle state.

The sending unit 404 is configured to execute backoff on the designated random contention channel after the sensing unit 403 detects that the designated random contention channel is in an idle state, which includes:

being configured to execute backoff on the designated random contention channel after the sensing unit 403 detects that the designated random contention channel is in an idle state; and send data on the designated random contention channel after a backoff time of the station ends.

Optionally, the receiving unit 402 being configured to receive an indication frame sent by an access point includes:

being configured to receive the indication frame sent by the access point, where the indication frame includes channel frequency information of the designated random contention channel; and the sensing unit 403 being configured to sense, according to the indication frame received by the receiving unit 402, a channel state of the designated random contention channel includes:

being configured to sense, according to the channel frequency information, of the designated random contention channel, received by the receiving unit 402, the channel state of the designated random contention channel.

Optionally, the receiving unit 402 being configured to receive an indication frame sent by an access point includes:

being configured to receive the indication frame sent by the access point, where the indication frame includes time information of random contention;

the receiving unit 402 is further configured to acquire, according to the time information, of random contention, included in the received indication frame, a time of random contention for sending, by the station, data on the designated random contention channel; and the sending unit 404 being configured to send data on the designated random contention channel after the sensing unit 403 detects that the designated random contention channel is in an idle state includes:

being configured to send data on the designated random contention channel within the time, of random contention, acquired by the receiving unit 402 after the sensing unit 403 detects that the designated random contention channel is in an idle state.

The sensing unit 403 being configured to sense, according to the indication frame received by the receiving unit 402, a channel state of the designated random contention channel includes:

being configured to detect, according to the indication frame received by the receiving unit 402, signal strength on the designated random contention channel; and determine that the designated random contention channel is in an idle state when the detected signal strength on the designated random contention channel is less than or equal to a preset threshold.

Optionally, the sensing unit 403 being configured to sense, according to the indication frame received by the receiving unit 402, a channel state of the designated random contention channel includes:

detecting, by the station on a spectrum, signal strength on a subcarrier corresponding to the designated random contention channel; and determining that the designated random contention channel is in an idle state when the detected signal strength on the subcarrier corresponding to the designated random contention channel is less than or equal to a preset threshold.

Optionally, the receiving unit 402 being configured to receive an indication frame sent by an access point includes:

being configured to receive the indication frame sent by the access point, where the indication frame includes period time information of random contention;

the receiving unit 402 is further configured to acquire, according to the period time information, of random contention, included in the received indication frame, a period time of random contention for sending, by the station, data on the designated random contention channel; and the sensing unit 403 being configured to sense, according to the indication frame received by the receiving unit 402, a channel state of the designated random contention channel includes:

being configured to send data on the designated random contention channel within the period time of random contention after it is detected that the designated random contention channel is in an idle state.

Optionally, the sending unit 404 being configured to send data on the designated random contention channel after the sensing unit 403 detects that the designated random contention channel is in an idle state includes:

being configured to send data to the access point or another station on the designated random contention channel after the sensing unit 403 detects that the designated random contention channel is in an idle state.

Optionally, the receiving unit 402 being configured to receive an indication frame sent by an access point includes:

the receiving unit 402 is configured to receive the indication frame sent by the access point, where the indication frame is further used for allocating a channel for scheduled transmission; and the sending unit 404 is further configured to send, according to the indication frame received by the receiving unit 402, data on the channel for scheduled transmission.

Optionally, the sending unit 404 being configured to send data on the designated random contention channel after it is detected that the designated random contention channel is in an idle state includes:

being configured to send data on the designated random contention channel in an Orthogonal Frequency-Division Multiple Access OFDMA manner, where the random contention channel and the channel for scheduled transmission satisfy orthogonal frequency-division multiplexing OFDM symbol synchronization.

Optionally, the receiving unit 402 is further configured to receive the indication frame sent by the access point, where the indication frame includes group number information of a designated station (401) group, a station 401 in the designated station (401) group can detect a signal of another station 401 in the designated station (401) group, and the station 401 in the designated station (401) group sends data by using a random contention channel; and the sending unit 404 is further configured to determine, according to the information, of the designated station group, received by the receiving unit 402, whether the station 401 belongs to the designated station group; and if determining that the station 401 belongs to the designated station group, execute backoff on the designated random contention channel after it is detected that the designated random contention channel is in an idle state. The station that belongs to the designated station group can detect a signal of another station in the designated station group.

Optionally, the receiving unit 402 is further configured to receive the indication frame sent by the access point, where the indication frame includes group number information of the designated station group.

The sending unit 404 is further configured to acquire, according to the group number information of the designated station group, a group number of the designated station group; and determine that the station 401 belongs to the designated station group when a group number of a station group to which the station 401 belongs is the same as the acquired group number of the designated station group.

Figure 8:
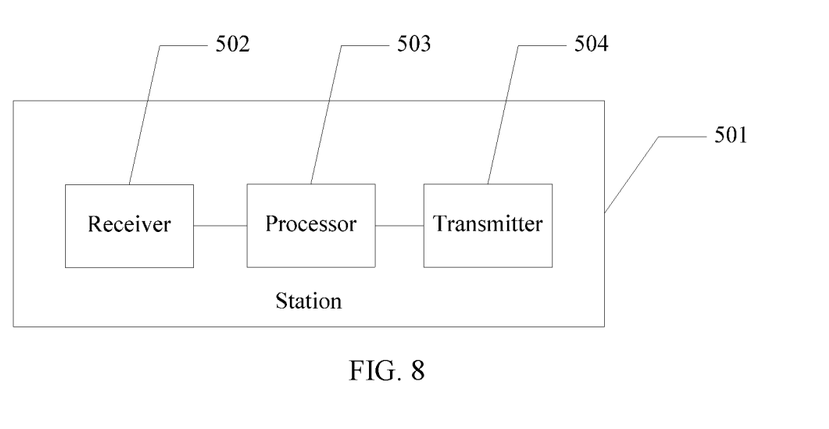
FIG. 8 is a structural block diagram of a station according to Embodiment 5.

As shown in FIG. 8, Embodiment 5 of the present invention provides a station 501, where a random contention channel and a channel for scheduled transmission exist in a network where the station 501 is located. The network is a network based on an unauthorized frequency band or a network based on an authorized frequency band. The station 501 includes:

a receiver 502, configured to receive an indication frame sent by an access point, where the indication frame is used for designating a random contention channel;

a processor 503, configured to sense, according to the indication frame received by the receiver 502, a channel state of the designated random contention channel; and a transmitter 504, configured to send data on the designated random contention channel after the processor 503 detects that the designated random contention channel is in an idle state.

Optionally, the transmitter 504 being configured to send data on the designated random contention channel after the processor 503 detects that the designated random contention channel is in an idle state includes:

being configured to execute backoff on the designated random contention channel after the processor 503 detects that the designated random contention channel is in an idle state; and send data on the designated random contention channel after a backoff time of the station ends.

Optionally, the receiver 502 is further configured to receive the indication frame sent by the access point, where the indication frame includes channel frequency information of the designated random contention channel; and the processor 503 is further configured to sense, according to the channel frequency information, of the designated random contention channel, included in the indication frame received by the receiver 502, a channel state of the designated random contention channel.

Optionally, the receiver 502 is further configured to receive the indication frame sent by the access point, where the indication frame includes time information of random contention;

the processor 503 is further configured to acquire, according to the time information, of random contention, included in the indication frame received by the receiver 502, a time of random contention for sending, by the station 501, data on the designated random contention channel; and the transmitter 504 is further configured to send data on the designated random contention channel within the time of random contention after the processor 503 detects that the designated random contention channel is in an idle state.

Optionally, the processor 503 is further configured to detect, according to the indication frame, signal strength on the designated random contention channel; and determine that the designated random contention channel is in an idle state when the detected signal strength on the designated random contention channel is less than or equal to a preset threshold.

Optionally, the processor 503 is further configured to detect, on a spectrum according to the indication frame, signal strength on a subcarrier corresponding to the designated random contention channel; and determine that the designated random contention channel is in an idle state when the detected signal strength on the subcarrier corresponding to the designated random contention channel is less than or equal to a preset threshold.

Optionally, the receiver 502 is further configured to receive the indication frame sent by the access point, where the indication frame includes period time information of random contention;

the processor 503 is further configured to acquire, according to the period time information, of random contention, included in the indication frame, a period time of random contention for sending, by the station, data on the designated random contention channel; and the transmitter 504 is configured to send data on the designated random contention channel within the period time of random contention after the processor 503 detects that the designated random contention channel is in an idle state.

Optionally, the transmitter 504 being configured to send data on the designated random contention channel after the processor 503 detects that the designated random contention channel is in an idle state includes:

the transmitter 504 is configured to send data to the access point or another station on the designated random contention channel after the processor 503 detects that the designated random contention channel is in an idle state.

Optionally, the receiver 502 is further configured to receive the indication frame sent by the access point, where the indication frame is further used for allocating a channel for scheduled transmission; and the transmitter 504 is configured to send, according to the indication frame, data on the channel for scheduled transmission.

Optionally, the transmitter 504 being configured to send data on the designated random contention channel after the processor 503 detects that the designated random contention channel is in an idle state includes:

the transmitter 504 is configured to send data on the designated random contention channel in an Orthogonal Frequency-Division Multiple Access OFDMA manner, where the random contention channel and the channel for scheduled transmission satisfy orthogonal frequency-division multiplexing OFDM symbol synchronization.

Optionally, the receiver 502 is further configured to receive the indication frame sent by the access point, where the indication frame includes information of a designated station group, a station 501 in the designated station group can detect a signal of another station 501 in the designated station group, and the station 501 in the designated station group sends data by using a random contention channel; and the processor 503 is further configured to determine, according to the information, of the designated station group, included in the indication frame received by the receiver 502, whether the station 501 belongs to the designated station group; and if the processor 503 determines that the station 501 belongs to the designated station group, the station 501 executes backoff on the designated random contention channel when the designated random contention channel is in an idle state.

Optionally, the receiver 502 is further configured to receive the indication frame sent by the access point, where the indication frame includes group number information of the designated station group; and the processor 503 is further configured to acquire, according to the group number information, of the designated station group, included in the indication frame received by the receiver 502, a group number of the designated station group; and determine that the station 501 belongs to the designated station group when a group number of a station group to which the station 501 belongs is the same as the group number of the designated station group.

Optionally, the receiver 502 is further configured to receive the indication frame sent by the access point, where the indication frame includes period time information of random contention;

the processor 503 is further configured to acquire, according to the period time information, of random contention, included in the indication frame received by the receiver 502, a period time of random contention for sending, by the station 501, data on the designated random contention channel; and the transmitter 504 is further configured to send data on the designated random contention channel within a time of random contention within the period time, of random contention, obtained by the processor 503.

Optionally, the transmitter 504 is configured to send data to the access point or another station 501 on the designated random contention channel.

Optionally, the receiver 502 is configured to receive the indication frame sent by the access point, where the indication frame is further used for allocating a channel for scheduled transmission; and the transmitter 504 is further configured to send, according to the indication frame received by the receiver 502, data on the channel for scheduled transmission.

During specific implementation, the present invention further provides a computer storage medium, where the computer storage medium may store a program, and when the program is executed, some or all of the steps in each embodiment of the data transmission method provided in the present invention may be included. The storage medium may be a magnetic disk, an optical disc, a read-only memory (Read-Only Memory, ROM), a random access memory (Random Access Memory, RAM), or the like.

The data transmission method and the station provided in the embodiments of the present invention are described in detail above. The principle and implementation manner of the present invention are described herein by using specific examples. The foregoing description about the embodiments is merely provided to help understand the method and core ideas of the present invention. In addition, persons of ordinary skill in the art can make variations and modifications to the present invention in terms of the specific implementation manners and application scopes according to the ideas of the present invention. Therefore, the content of the specification shall not be construed as a limit to the present invention.

What is claimed is:

1. A data transmission method, comprising:
    receiving, by a station, an indication frame sent by an access point, wherein the indication frame is used for allocating a designated random contention channel for use during a time period of random contention for sending, and for allocating a channel for scheduled transmission for use during the time period of random contention for sending;
    sensing, by the station, according to the indication frame, a channel state of the designated random contention channel; and
    sending, by the station, data on the designated random contention channel after it is detected that the designated random contention channel is in an idle state.

2. The data transmission method according to claim 1, wherein the sending, by the station, the data on the designated random contention channel after it is detected that the designated random contention channel is in the idle state comprises:
    executing, by the station, backoff on the designated random contention channel after it is detected that the designated random contention channel is in an idle state; and
    sending, by the station, the data on the designated random contention channel after a backoff time of the station ends.

3. The data transmission method according to claim 1, wherein the receiving, by the station, the indication frame comprises:
    receiving the indication frame, wherein the indication frame comprises channel frequency information of the designated random contention channel; and
    the sensing, according to the indication frame, the channel state of the designated random contention channel comprises:
    sensing, according to the channel frequency information of the designated random contention channel, the channel state of the designated random contention channel.

4. The data transmission method according to claim 1, wherein the receiving the indication frame sent by the access point comprises:
    receiving the indication frame, wherein the indication frame comprises time information of random contention, wherein the time information includes a start time of the random contention and a duration;
    the method further comprises:
    acquiring, according to the time information of random contention, the time period of random contention for sending, by the station, the data on the designated random contention channel; and
    the sending, by the station, the data on the designated random contention channel after it is detected that the designated random contention channel is in the idle state comprises:
    sending, by the station, the data on the designated random contention channel within the time period of random contention after it is detected that the designated random contention channel is in the idle state.

5. The data transmission method according to claim 1, wherein the sensing, according to the indication frame, the channel state of the designated random contention channel comprises:
    detecting, by the station, signal strength on the designated random contention channel according to the indication frame; and
    determining that the designated random contention channel is in the idle state when the detected signal strength on the designated random contention channel is less than or equal to a preset threshold.

6. The data transmission method according to claim 1, wherein the sensing, according to the indication frame, the channel state of the designated random contention channel comprises:
    detecting, by the station, signal strength on a subcarrier corresponding to the designated random contention channel; and
    determining that the designated random contention channel is in the idle state when the detected signal strength on the subcarrier corresponding to the designated random contention channel is less than or equal to a preset threshold.

7. The data transmission method according to claim 1, wherein the receiving the indication frame sent by the access point comprises:
receiving the indication frame sent by the access point, wherein the indication frame comprises time period information of random contention;
the method further comprises:
acquiring, according to the time period information of random contention, the time period of random contention for sending, by the station, the data on the designated random contention channel; and
the sending, by the station, the data on the designated random contention channel after it is detected that the designated random contention channel is in the idle state comprises:
sending the data on the designated random contention channel within the time period of random contention after it is detected that the designated random contention channel is in the idle state.

8. The data transmission method according to claim 1, wherein the sending, by the station, the data on the designated random contention channel after it is detected that the designated random contention channel is in the idle state comprises:
sending, by the station, the data to the access point or another station on the designated random contention channel after it is detected that the designated random contention channel is in the idle state.

9. The data transmission method according to claim 1, further comprising sending, according to the indication frame, the data on the channel for scheduled transmission during the time period of random contention for sending.

10. The data transmission method according to claim 9, wherein the sending, by the station, the data on the designated random contention channel after it is detected that the designated random contention channel is in the idle state comprises:
sending, by the station, the data on the designated random contention channel in an Orthogonal Frequency-Division Multiple Access (OFDMA) manner, wherein the random contention channel and the channel for scheduled transmission satisfy orthogonal frequency-division multiplexing (OFDM) symbol synchronization.

11. A station, comprising:
a receiver, configured to receive an indication frame sent by an access point, wherein the indication frame is used for designating a random contention channel for use during a time period of random contention for sending, and for allocating a channel for scheduled transmission for use during the time period of random contention for sending;
a processor coupled to the receiver and configured to sense, according to the indication frame received by the receiver, a channel state of the designated random contention channel; and
a transmitter coupled to the processor and configured to send data on the designated random contention channel after the processor detects that the designated random contention channel is in an idle state.

12. The station according to claim 11, wherein the transmitter is configured to execute backoff on the designated random contention channel after the processor detects that the designated random contention channel is in the idle state, which comprises:
being configured to execute backoff on the designated random contention channel after the processor detects that the designated random contention channel is in the idle state; and send the data on the designated random contention channel after a backoff time of the station ends.

13. The station according to claim 11, wherein the receiver being configured to receive the indication frame sent by the access point comprises:
being configured to receive the indication frame sent by the access point, wherein the indication frame comprises channel frequency information of the designated random contention channel; and
the processor being configured to sense, according to the indication frame received by the receiver, the channel state of the designated random contention channel comprises:
being configured to sense, according to the channel frequency information of the designated random contention channel, the channel state of the designated random contention channel.

14. The station according to claim 11, wherein the receiver being configured to receive an indication frame sent by the access point comprises:
being configured to receive the indication frame sent by the access point, wherein the indication frame comprises time information of random contention, wherein the time information includes a start time of the random contention and a duration;
the receiver is further configured to acquire, according to the time information of random contention, the time period of random contention for sending, by the station, the data on the designated random contention channel; and
the transmitter being configured to send the data on the designated random contention channel after the processor detects that the designated random contention channel is in the idle state comprises:
being configured to send the data on the designated random contention channel within the time period of random contention, after the processor detects that the designated random contention channel is in the idle state.

15. The station according to claim 11, wherein the processor being configured to sense, according to the indication frame received by the receiver, the channel state of the designated random contention channel comprises:
being configured to detect, according to the indication frame received by the receiver, signal strength on the designated random contention channel; and determine that the designated random contention channel is in the idle state when the detected signal strength on the designated random contention channel is less than or equal to a preset threshold.

16. The station according to claim 11, wherein the processor being configured to sense, according to the indication frame received by the receiver, the channel state of the designated random contention channel comprises:
detecting, by the station, signal strength on a subcarrier corresponding to the designated random contention channel; and determining that the designated random contention channel is in the idle state when the detected signal strength on the subcarrier is less than or equal to a preset threshold.

17. The station according to claim 11, wherein the receiver being configured to receive the indication frame sent by the access point comprises:
   being configured to receive the indication frame sent by the access point, wherein the indication frame comprises time period information of random contention;
   the receiver is further configured to acquire, according to the time period information of random contention, the time period of random contention for sending, by the station, the data on the designated random contention channel; and
   the processor being configured to sense, according to the indication frame, the channel state of the designated random contention channel comprises:
   being configured to send the data on the designated random contention channel within the time period of random contention after it is detected that the designated random contention channel is in the idle state.

18. The station according to claim 11, wherein:
   the transmitter being configured to send the data on the designated random contention channel after the processor detects that the designated random contention channel is in the idle state comprises:
   being configured to send the data to the access point or another station on the designated random contention channel after the processor detects that the designated random contention channel is in the idle state.

19. The station according to claim 11, wherein
   the transmitter is further configured to send, according to the indication frame, the data on the channel for scheduled transmission during the time period of random contention for sending.

20. The station according to claim 19, wherein the transmitter being configured to send data on the designated random contention channel after it is detected that the designated random contention channel is in the idle state comprises:
   being configured to send the data on the designated random contention channel in an Orthogonal Frequency-Division Multiple Access (OFDMA) manner, wherein the random contention channel and the channel for scheduled transmission satisfy orthogonal frequency-division multiplexing (OFDM) symbol synchronization.

* * * * *